United States Patent [19]

Kanazawa et al.

[11] Patent Number: 4,657,102
[45] Date of Patent: Apr. 14, 1987

[54] FOUR-WHEEL STEERING DEVICE FOR VEHICLE

[75] Inventors: Hirotaka Kanazawa; Teruhiko Takatani; Naoto Takata, all of Hiroshima, Japan

[73] Assignee: Toyo Kogyo Co., Ltd., Hiroshima, Japan

[21] Appl. No.: 821,875

[22] Filed: Jan. 27, 1986

Related U.S. Application Data

[63] Continuation of Ser. No. 546,174, Oct. 27, 1983, abandoned.

[30] Foreign Application Priority Data

Oct. 28, 1982 [JP] Japan .................. 57-189448
Oct. 29, 1982 [JP] Japan .................. 57-190045
Oct. 29, 1982 [JP] Japan .................. 57-190046

[51] Int. Cl.$^4$ ............................ B62D 5/06; B62D 3/06
[52] U.S. Cl. ..................................... 180/140; 180/142; 280/91
[58] Field of Search ............... 180/140, 141, 142, 143; 280/91, 99

[56] References Cited

U.S. PATENT DOCUMENTS 4,105,086 8/1978 Ishii et al. ............... 180/143
4,295,657 10/1981 Sano et al. ............... 280/91
4,313,514 2/1982 Furukawa et al. ............ 180/143
4,412,594 11/1983 Furukawa et al. ............ 180/140
4,418,780 12/1983 Ito et al. ................. 180/142
4,441,572 4/1984 Ito et al. ................. 180/140

FOREIGN PATENT DOCUMENTS

56-5270 of 1981 Japan.
56-163969 of 1981 Japan.
56-167562 of 1981 Japan.
57-70774 5/1982 Japan ..................... 180/142
337411 10/1930 United Kingdom ............ 280/91

Primary Examiner—John A. Pekar
Attorney, Agent, or Firm—Ferguson, Jr., Gerald J.; Michael P. Hoffman; Ronni S. Malamud

[57] ABSTRACT

In a four-wheeled vehicle, the rear wheels are turned as well as the front wheels in response to operation of the steering wheel. The rear wheel turning angle characteristics relative to the front wheel turning angle is changed according to the vehicle speed. In the low to high vehicle speed region, the rear wheel turning angle is increased with increase of the front wheel turning angle and the increasing rate is increased as the vehicle speed increases. In the very low vehicle speed region, the rear wheels are not turned until the front wheels are turned at least by a predetermined angle, and are turned in the direction opposite to the front wheels when the front wheels are turned by an angle larger than the predetermined angle. The rear wheel turning angle in the opposite direction is changed in proportion to the front wheel turning angle.

13 Claims, 5 Drawing Figures

FOUR-WHEEL STEERING DEVICE FOR VEHICLE

This application is a continuation of Ser. No. 546,174, filed Oct. 27, 1983, now abandoned.

BACKGROUND OF THE INVENTION

1. Field of the Invention

This invention relates to a steering device for a four-wheeled vehicle, and more particularly to a four-wheel-steering device in which both the front and rear wheels are turned when the steering wheel is turned.

2. Description of the Prior Art

Conventionally, four-wheeled vehicles are steered by turning only the front wheels and the rear wheels are not positively turned though the rear wheels are caused to slightly toe in or out independently of the front wheels, according to the running condition of the vehicle.

Recently, there has been proposed a four-wheel steering device in which the rear wheels are also turned in response to operation of the steering wheel. See U S. Pat. No. 4,295,657, for example.

The four-wheel steering device greatly improves the driving stability and makes various convenient operations of the vehicle feasible. For example, when the rear wheels are turned in the direction opposite to the front wheels referred to as "reverse phase" turning) during very low speed operation of the vehicle to drive into a very limited parking space, the orientation of the vehicle body can be changed by a large amount to facilitate the parking operation. Further, the reverse phase turning of the front and rear wheels is advantageous in that the minimum turning radius of the vehicle can be minimized to facilitate U-turns, and the difference between the turning radii of the inner front wheel and the inner rear wheel can be minimized to facilitate operation of the vehicle on turning a narrow corner. Further, when the front and rear wheels are turned in the same direction (referred to as "equal phase" turning) during very low speed operation, the vehicle body can be laterally moved in translation. This is convenient for parking in a limited space.

Further when the front and rear wheels are turned in the equal phase when changing running lanes during intermediate to high speed operation of the vehicle, a lateral force acts simultaneously on the front and rear wheels to permit smooth lane-change with the yawing movement of the vehicle body being limited, whereby the operator can change running lanes safely even during high speed operation. By turning the rear wheels in the reverse phase, orientation of the vehicle body can be efficiently changed during cornering.

Further by turning the rear wheels so as to oppose them to external disturbances acting on the vehicle body such as lateral wind during straight travel of the vehicle, high running stability can be obtained during straight travel at high speed.

In the conventional steering systems in which only the front wheels are turned to steer the vehicle, the steering characteristics are adjusted to exhibit slight understeer tendency in order to ensure good stability during straight travel, and therefore, the vehicle tends to turn on a larger radius when accelerated with the turning angle of the steering wheel kept constant during cornering. In the four-wheel steering device, this tendency can be corrected by turning the rear wheels in the reverse phase. That is, in the four-wheel steering device, good cornering stability can be ensured even if the vehicle is accelerated or decelerated during cornering, by changing the turning angle of the rear wheels in response to the acceleration or the deceleration.

The four-wheel steering device is advantageous also from the roominess of the vehicle since it makes it possible to reduce the minimum turning radius of the vehicle for a given wheel base and accordingly the wheel base of the vehicle can be enlarged. Further, it provides an increased freedom in design of the vehicle body since it permits the maximum turning angle of the front wheels to be much smaller than that of the conventional two-wheel steering device.

Thus, the four-wheel steering device is advantageous from various viewpoints and is very useful.

There have been proposed various arrangements for effectively turning the rear wheels in the four-wheel steering device. For example, in the four-wheel steering disclosed in U.S. Pat. No. 4,313,514, the rear wheels are turned in the reverse phase during low speed operation of the vehicle while they are turned in the equal phase during a high speed operation. In the device disclosed in Japanese Unexamined Patent Publication No. 56(1981)-5270, the rear wheels are turned in the equal phase when the turning angle of the front wheels is small while they are turned in the reverse phase when the turning angle of the front wheels is large. Further in the device disclosed in Japanese Unexamined Patent Publication No. 56(1981)-163969, the rear wheels are turned in proportion to the turning angle of the front wheels when the turning angle of the front wheels is smaller than a predetermined value, while the rear wheels are kept at a predetermined turning angle independent of the turning angle of the front wheels when the turning angle of the front wheels is not smaller than the predetermined value.

These four-wheel steering devices are directed to turning the rear wheels in the desirable direction based on the empirical rule that in most cases where orientation of the vehicle body is to be changed by a large amount, the vehicle speed is low or the turning angle of the front wheels is large, and in most cases where a slight lateral movement of the vehicle body is desired, the vehicle speed is high or the turning angle of the front wheels is small.

However, as a matter of fact, completely satisfactory driving performance and running stability cannot be obtained when the vehicle speed and the turning angle of the front wheels are only taken into account independently of each other. For example, even if the turning angle of the front wheels is fixed at a given angle and the rear wheels are turned by a desirable angle corresponding to the given turning angle of the front wheels during cornering, the vehicle tends to go out of the originally intended course outwardly or inwardly when the vehicle is accelerated or decelerated during the cornering. This is because the centrifugal force (lateral force) acting on the vehicle body changes with the vehicle speed. In order to prevent the vehicle from going out of the originally intended course, the ratio of the turning angle of the rear wheels to that of the front wheels (referred to as the "turning angle ratio" hereinbelow) must be changed with change in the vehicle speed. Accordingly the turning angle ratio is preferred to be changed according to the vehicle speed. Further, during intermediate to high speed operation of the vehicle, it is preferred that the turning angle ratio be increased in the equal phase as the vehicle speed is increased so that the lateral acceleration G is increased to permit smooth lane-changing, thereby improving the driving performance. On the other hand, it is preferred that the turning angle ratio be reduced as the vehicle speed is lowered from a high speed to an intermediate speed, to reduce the lateral acceleration G.

In the case of the four-wheel steering device disclosed in U.S. Pat. No. 4,313,514 in which the rear wheels are turned in the reverse phase during low speed operation of the vehicle, there is a danger that when a vehicle which has been parked near a wall, for example, is started with the steering wheel turned sharply, the rear part of the vehicle could collide against the wall since the rear wheels are turned in the reverse phase at a low speed. Further when the vehicle speed is abruptly reduced from a speed in the intermediate-to-high region by abrupt braking, the rear wheels could be turned in the reverse phase to cause the vehicle to make a dangerous sharp turn. In order to overcome these problems, there has been proposed a four-wheel steering device in which the turning angle ratio is made zero, i.e., the rear wheels are not turned, during low speed operation of the vehicle. See Japanese Unexamined Patent Publication No. 56(1981)167562, for example. However, this approach is disadvantageous in that the four-wheel steering device behaves in the same manner as the ordinary steering device in the low speed region and accordingly the merit of the four-wheel steering device in making U-turns at a low speed or changing the orientation of the vehicle by a large amount at a low speed cannot be obtained.

SUMMARY OF THE INVENTION

In view of the foregoing observations and description, the primary object of the present invention is to provide an improved four-wheel steering device which is free from the drawbacks described above and which can sufficiently utilize the features inherent to four-wheel steering devices.

In accordance with the present invention, the rear wheel turning angle characteristic relative to the front wheel turning angle is changed according to the vehicle speed, and in the very low vehicle speed region, the rear wheel turning angle is kept at zero when the front wheel turning angle is smaller than a predetermined value and is reduced to less than zero when the front wheel turning angle exceeds the predetermined value. That is, during very low speed operation of the vehicle the rear wheels are not turned until the front wheels are turned at least by a predetermined angle, and are turned in the direction opposite to the front wheels when the front wheels are turned by an angle larger than the predetermined angle.

More particularly, the four-wheel steering device in accordance with the present invention comprises a front wheel steering mechanism for turning the front wheels, a rear wheel steering mechanism for turning the rear wheels, a vehicle speed sensor and a controller for controlling the rear wheel steering mechanism and is characterized in that the controller controls the rear wheel steering mechanism so that the rear wheel turning angle is changed in accordance with a turning angle ratio characteristic curve which is defined on a $\theta F$-$\theta R$ plane (a rectangular coordinate system in which the abscissa represents $\theta F$ and the ordinate represents $\theta R$) wherein $\theta F$ and $\theta R$ respectively represent the front wheel turning angle and the rear wheel turning angle and which is changed according to the vehicle speed, the turning angle ratio characteristic curves for very low vehicle speeds not higher than a predetermined speed including a first portion extending on the 8F axis in the region in which the value of $\theta F$ is smaller than a predetermined value and a second portion having a negative inclination to extend into quadrant IV of said coordinate system where the value of $\theta R$ is less than zero, the absolute value of the inclination of the second portion being increased with reduction of the vehicle speed.

In the region where the turning angle ratio characteristic curve is on the $\theta F$ axis the rear wheel turning angle is fixed at zero. In the region where the turning angle ratio characteristic curve is in quadrant IV, i.e., when the value of $\theta R$ is negative, the rear wheels are turned in the reverse phase or in the direction opposite to the front wheels. The point from which the rear wheels start to be turned in the reverse phase, i.e., the point on the $\theta F$ axis having the value of $\theta F$ equal to said predetermined value will be referred to as the "reverse phase starting point" in this specification.

Thus in the four-wheel steering device of the present invention, the vehicle body does not abruptly change its orientation when starting and at the same time is not caused to make a dangerous sharp turn even if the vehicle speed is abruptly reduced since the rear wheels are not turned when the vehicle speed is very low and the front wheel turning angle is small.

Further, in the four-wheel steering device of the present invention, the rear wheels are positioned in the neutral position (i.e., the rear wheel turning angle $\theta R=0$) should the vehicle speed sensor malfunction and output a signal representing that the vehicle speed is zero irrespective of the actual vehicle speed. Thus, safety is assured.

DESCRIPTION OF THE PREFERRED EMBODIMENTS

Figure 1:
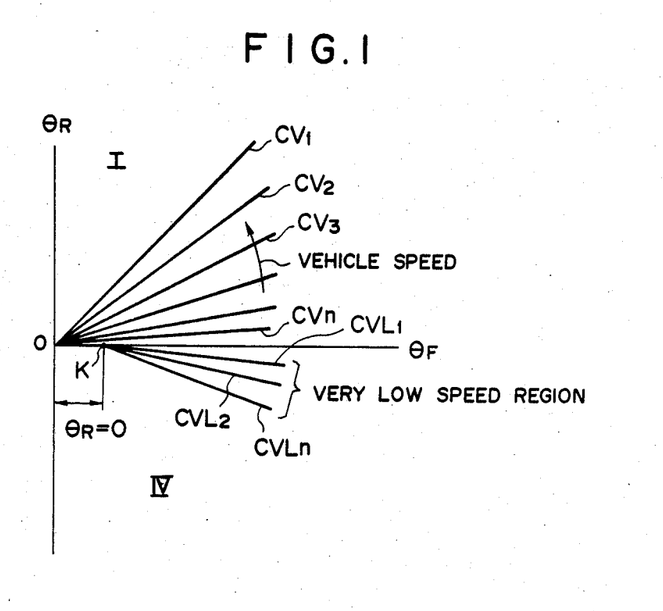
FIGS. 1 to 3 respectively show several examples of control characteristics according to which the rear wheels are controlled in the four-wheel steering device of the present invention.
Figure 2:
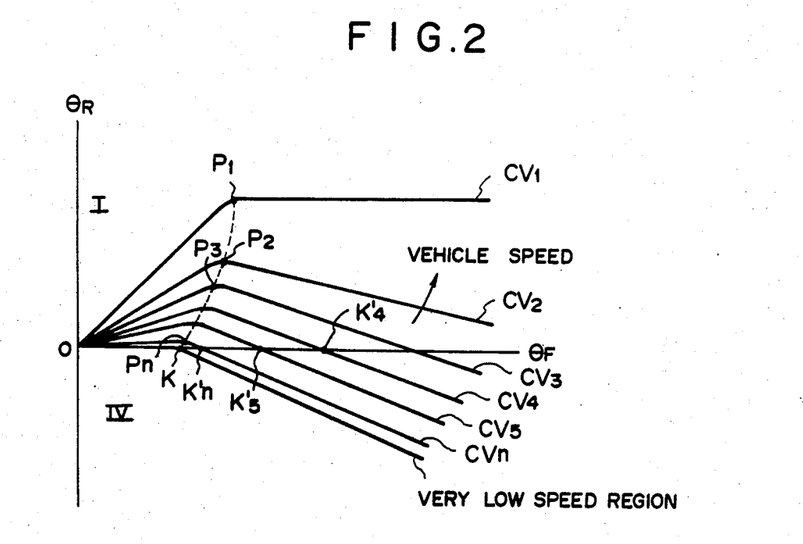
Figure 3:
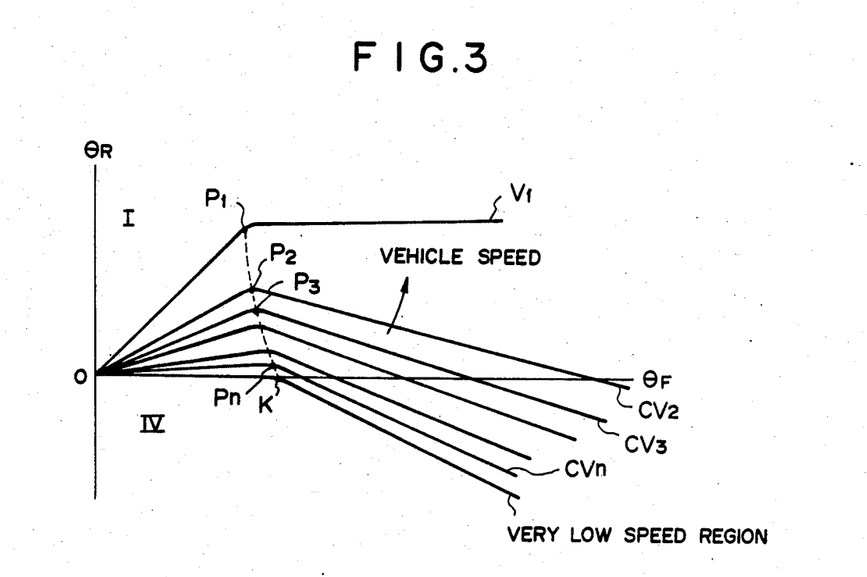

FIGS. 1 to 3 respectively show control characteristics of the controller in accordance with several embodiments of the present invention.

As described above, the rear wheel turning angle is controlled in accordance with a turning angle ratio ($\theta R/\theta F$) characteristic curve which is determined for each vehicle speed.

In the embodiment shown in FIG. 1, the turning ratio characteristic curves which are respectively used for controlling the rear wheel turning angle when the vehicle speeds are V1, V2 . . . and Vn are indicated at CV1, CV2 . . . and CVn, respectively. The characteristic curves CVL1 to CVLn are used when the vehicle speed is in the very low speed region which is typically below 10Km/h. For example, when the vehicle speed is V1, the rear wheel turning angle is controlled in accordance with the curve CV1, and when the vehicle speed is VL1, the rear wheel turning angle is controlled in accordance with the curve CVL1. In this embodiment, when the vehicle speed is from Vn to V1, the rear wheel turning angle is increased in proportion to increase of the front wheel turning angle, and the increasing rate, i.e., the inclination of the curves CVn to CV1, is increased as the vehicle speed is increased. Thus the turning angle ratio is increased with increase of the vehicle speed so that the response of the rear wheels for steering operation of the front wheels is improved as the vehicle speed increases, whereby sufficient lateral force is exerted on the vehicle body during high speed operation to facilitate lane-changing. On the other hand, when the vehicle speed is low, orientation of the vehicle body can be easily changed since the turning angle ratio is reduced with reduction of the vehicle speed.

In the very low vehicle speed region, the rear wheel turning angle is fixed at zero until the front wheel turning angle reaches a predetermined value indicated at K in FIG. 1 irrespective of the vehicle speed. When the front wheel turning angle exceeds the predetermined value K, the rear wheels are turned in the reverse phase or in the direction opposite to the front wheels. That is, the turning angle ratio characteristics curves CVL1 to CVLn for the very low vehicle speeds VL1 to VLn extend on the $\theta F$ axis in the region in which the value of $\theta F$ is smaller than the predetermined value K and have a negative inclination to extend into quadrant IV in the region in which the value of $\theta F$ is not smaller than the predetermined value K. The absolute value of the inclination of the curves CVL1 to CVLn in quadrant IV is increased with reduction of the vehicle speed. Preferably the predetermined value K is about 5°. Said reverse phase starting point denotes the point on the $\theta F$ axis having the value of $\theta F$ equal to the predetermined value K.

Thus, reference character K will sometimes be used to denote the reverse phase starting point, hereinbelow. Generally it can be considered that the vehicle is intended to be turned by a large amount when the vehicle speed is very low and the front wheel turning angle is large. Therefore, the rear wheels are turned in the reverse phase when the vehicle speed is very low and the front wheel turning angle is larger than the predetermined value K.

In the embodiments shown in FIGS. 2 and 3, the turning angle ratio characteristic curves for the very low vehicle speeds are similar to those in the embodiment shown in FIG. 1, and accordingly will not be described here.

In the embodiment shown in FIG. 2, the turning angle ratio characteristics curves CV1 to CVn for low-to-high vehicle speeds V1 to Vn (typically higher than 10Km/h) are substantially broken lines respectively having inflection points P1 to Pn at which their inclinations are changed. Each curve has a positive inclination in the region where the value of $\theta F$ is smaller than the value of $\theta F$ at the inflection point. The inclination of the curves CVn to CV1 in the region is increased with increase of the vehicle speed. That is, the rear wheel turning angle is increased with increase of the front wheel turning angle until the inflection point of the curve for the given vehicle speed is reached and the increasing rate of the rear wheel turning angle is increased as the vehicle speed increases. Thus the turning angle ratio $\theta R/\theta F$ is increased as the vehicle speed increases. The curves for high speeds (typically higher than 80Km/h) represented by the curve CV1 have a zero or negative inclination in the region where the value of $\theta F$ is not smaller than the value of $\theta F$ at the inflection point. The curves for high speeds do not intersect the $\theta F$ axis within the defining range of the turning ratio characteristics curve. As will be apparent to those skilled in the art, the curve is defined only in the range where the value of $\theta F$ is not larger than the maximum turning angle of the front wheels.

On the other hand, the curves CVn to CV2 for low-to-intermediate speeds Vn to V2 have a negative inclination in the region where the value of $\theta F$ is not smaller than the value of $\theta F$ at the inflection point and intersect the $\theta F$ axis at points K'n, K'5 ... That is, in the low to intermediate vehicle speed region, the rear wheel turning angle is increased with increase of the front wheel turning angle until the inflection point is reached and then gradually reduced as the front wheel turning angle increases to finally become less than zero, i.e., the rear wheels are finally turned in the reverse phase. The intersection of the $\theta F$ axis and the turning angle ratio characteristic curve has a larger value of $\theta F$ as the vehicle speed increases, i.e., the values of $\theta F$ at the points K'n, K'5, K'4 ... decrease in this order.

It is preferred that the turning angle ratio characteristic curves for the low to high vehicle speeds be changed so that the inflection points P1 to Pn are continuously shifted to converge on the reverse phase starting point K of the characteristics curves for the very low vehicle speeds, whereby the rear wheel turning angle ratio $\theta/\theta F$ can be smoothly and continuously changed as the vehicle speed changes from very low speed to high speed. In the embodiment shown in FIG. 2, the inflection point is shifted, as the vehicle speed decreases, in the direction in which the value of $\theta F$ is reduced to converge on the reverse phase starting point K.

The embodiment shown in FIG. 3 is similar to that shown in FIG. 2 except that the inflection points P1 to Pn are shifted, as the vehicle speed decreases, in the direction in which the value of $\theta F$ increased to converge on the reverse phase starting point K.

In the embodiments shown in FIGS. 2 and 3, since the turning angle ratio is positive in the low to high vehicle speed region and the turning angle ratio is increased with increase of the vehicle speed, a G region in which the lateral acceleration G is apt to be generated can be obtained. Further, since the G characteristic is enlarged as the vehicle speed increases, the response to lane-changing operation of the steering wheel in the high speed region is greatly improved. Further, in the low-to-intermediate vehicle speed region, the rear wheel steering angle is reduced when the front wheel steering angle exceeds the predetermined value (the value of $\theta F$ at the inflection point), whereby a $\psi$ region in which yawing is apt to occur is obtained to improve cornering performance. Generally, it can be considered that in the low-to-intermediate vehicle speed region the operator intends to change lanes when the front wheel turning is relatively small and that the operator intends to turn a corner when the front wheel turning angle is large. Thus, in accordance with the embodiments shown in FIGS. 2 and 3, the cornering performance during the low-to-intermediate speed operation of the vehicle can be improved and at the same time lane-changing is made easy during low-to-intermediate speed operation.

Figure 4:
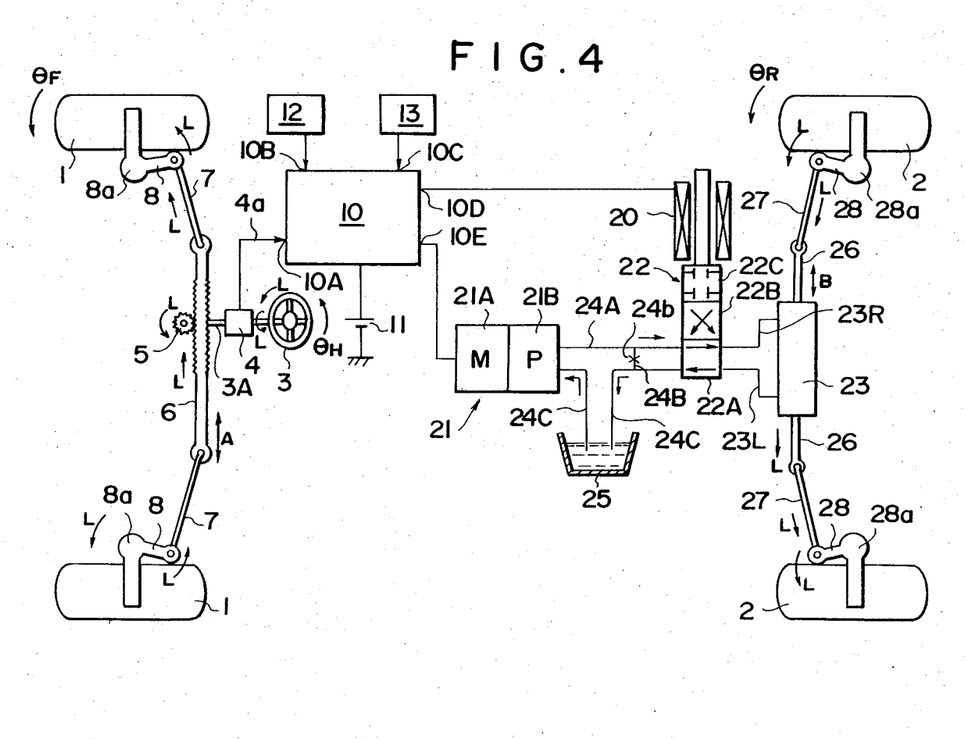
FIG. 4 is a schematic view illustrating a four-wheel steering device in accordance with an embodiment of the present invention.
Figure 5:
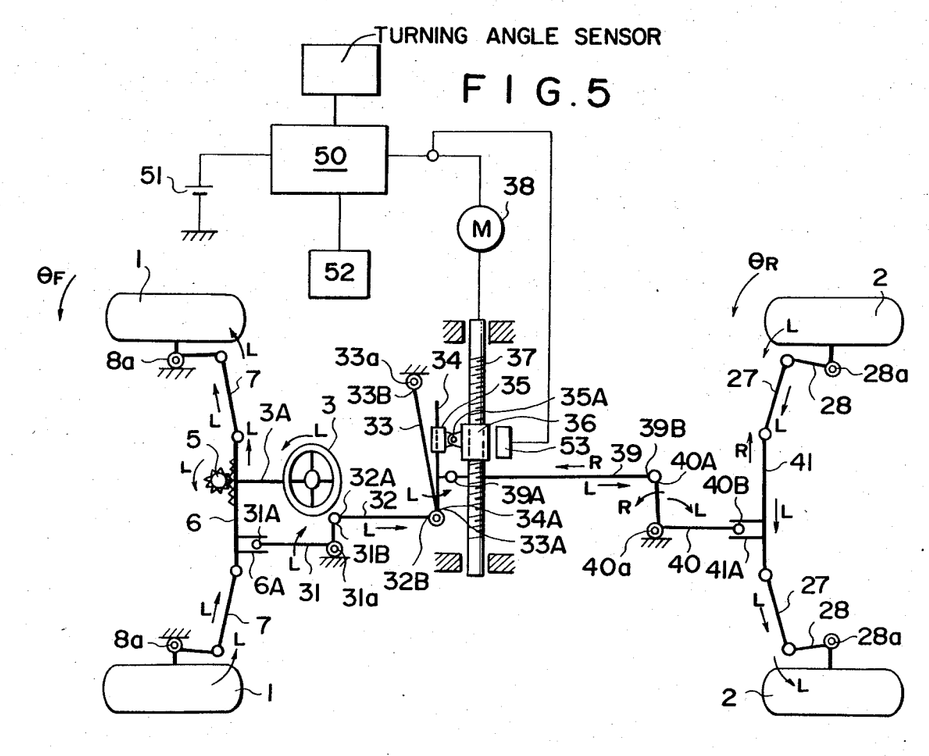
FIG. 5 is a schematic view illustrating a four-wheel steering device in accordance with another embodiment of the present invention.

FIG. 4 shows a four-wheel steering device in accordance with an embodiment of the present invention in which hydraulic pressure is utilized for controlling the rear wheels in accordance with the control characteristics of the present invention, while FIG. 5 shows another embodiment of the present invention in which a link mechanism is utilized for controlling the rear wheels.

In the embodiment shown in FIG. 4, front wheels 1 and rear wheels 2 are mechanically separated from each other, and the rear wheels 2 are turned under the control of a controller 10 into which is inputted the output of a front wheel turning angle sensor 4 for detecting the turning angle of the front wheels 1 by way of turning angle $\theta H$ of the steering wheel 3.

The front wheel steering mechanism comprises a steering shaft 3A to which the steering wheel 3 is fixed, a pinion 5, a rack 6, a pair of tie rods 7 connected on opposite ends of the rack 6, and a pair of knuckle arms 8 pivotable about pins 8a. The operation of this mechanism is well known. That is, when the steering wheel 3 is turned, the pinion 5 fixed to the lower end of the steering shaft 3A is rotated to move the rack 6 in the lateral direction of the vehicle body shown by the arrow A, whereby the front wheels 1 are turned by way of the tie rods 7 and the knuckle arms 8.

The operation of the steering device of this embodiment will be described taking the case where the steering wheel 3 is turned to the left.

When the steering wheel 3 is turned to the left as shown by the arrow L, the steering shaft 3A, the pinion 5, the rack 6, the tie rods 7 and the knuckle arms 8 are moved in the directions shown by the respective arrows L to turn the front wheels 1 leftward. The front wheel turning angle sensor 4 outputs a signal 4a representing that the steering wheel 3 is rotated by an angle $\theta H$ in the direction of the arrow L. The signal 4a is inputted into a front wheel turning angle input terminal 10A of the controller 10 for the rear wheel steering mechanism.

The controller 10 is connected to a power source 11 and has, in addition to the front wheel turning angle input terminal 10A, a vehicle speed input terminal 10B connected to a vehicle speed sensor 12, a feedback input terminal 10C connected to a rear wheel turning angle sensor 13, a turning direction output terminal 10D connected to a solenoid 20 for controlling the turning direction of the rear wheels 2, and a hydraulic pump control output terminal 10E connected to a driving motor 21A of a hydraulic pump device 21.

The hydraulic pump device 21 comprises the driving motor 21A and a hydraulic pump 21B for discharging hydraulic oil. The hydraulic pump 21B is connected to a hydraulic actuator 23 by way of a turning direction switching valve 22. An orifice passage 24B short-circuiting between an oil feed passage 24A and an oil return passage 24C is provided between the hydraulic pump 21B and the switching valve 22. The orifice passage 24B is provided with an orifice 24b at an intermediate portion thereof. The oil return passage 24C is provided with an oil reservoir 25 at an intermediate portion thereof.

The turning direction switching valve 22 has a normal valve part 22A, a reverse valve part 22B and a stop valve part 22C, each having a pair of inlets and a pair of outlets, each inlet being communicated with one outlet. The valve parts 22A to 22C are selectively connected with the oil feed passage 24A and the oil return passage 24C under the control of the solenoid 20. When each valve part is connected with the oil feed passage 24A and the oil return passage 24C, the pair of outlets of the valve part are respectively connected to right and left oil passages 23R and 23L of the hydraulic actuator 23 to selectively communicate the right and left oil passages 23R and 23L with the oil feed passage 24A and the oil return passage 24C. When the normal valve part 22A is positioned in the operative position, i.e., is connected with the oil feed passage 24A and the oil return passage 24C, the oil feed passage 24A is communicated with the right oil passage 23R of the hydraulic actuator 23 and the oil return passage 24C is communicated with the left oil passage 23L. When the reverse valve part 22B is positioned in the operative position, the oil feed passage 24A is communicated with the left oil passage 23L and the oil return passage 24C is communicated with the right oil passage 23R.

The hydraulic actuator 23 moves its output shaft 26 in the lateral direction of the vehicle body shown by the arrow B according to the difference between the pressure in the right oil passage 23R and the pressure in the left oil passage 23L. Each end of the output shaft 26 is connected to one of the rear wheels 2 by way of a tie rod 27 and a knuckle arm 28 pivotable about a pin 28a.

When the front wheels 1 are turned leftward in the direction of the arrow L and the rear wheels 2 are to be turned in the equal phase, i.e., in the same direction as the front wheels 1, the normal valve part 22A of the turning direction switching valve 22 is brought into the operative position and the hydraulic oil is fed into the oil feed passage 24A. The hydraulic oil flows into the oil return passage 24C passing through the orifice passage 24B, then returns to the hydraulic pump 21B via the reservoir 25. Thus the pressure becomes higher upstream of the orifice 24b than downstream of the same, and accordingly the pressure in the right oil passage 23R of the hydraulic actuator 23 connected to the oil feed passage 24A by way of the normal valve part 22A of the turning direction switching valve 22 becomes higher than the pressure in the left oil passage 23L connected to the return passage 24C. Thus the output shaft 26 of the actuator 23 is moved leftward to turn the rear wheels 2 leftward by way of the tie rods 27 and the knuckle arms 28. The amount of the movement of the output shaft 26 of the actuator 23 and accordingly the turning angle of the rear wheels 2 is determined according to the amount of electric current inputted into the driving motor 21A of the hydraulic pump device 21.

As can be easily understood from the description above, when the front wheels 1 are instead turned rightward and the rear wheels 2 are to be turned in the equal phase, the reverse valve part 22B of the turning direction switching valve 22 is brought into the operative position instead of the normal valve part 22A. Thus, the pressure in the left oil passage 23L of the hydraulic actuator 23 becomes higher than that in the right oil passage 23R, whereby the output shaft 26 is moved rightward to turn the rear wheels 2 rightwardly.

In case that the rear wheels 2 are to be turned in the reverse phase, i.e., to be turned in the direction opposite to the front wheels 1, the reverse valve part 22B is brought into the operative position when the front wheels 1 are turned leftward while the normal valve part 22A is brought into the operative position when the front wheels 1 are turned rightward.

When the rear wheel turning angle $\theta R$ is to be set at zero, the stop valve part 22C is brought into operative position to disconnect the hydraulic actuator 23 from the hydraulic pump 21B, thereby nullifying the difference in pressure between the right and left oil passages 23R and 23L of the actuator 23 to hold the output shaft 26 in the neutral position. It is preferred that the output shaft 26 of the actuator 23 be provided with a set load so that the output shaft 26 is positively positioned in the neutral position when the pressure difference is nullified.

The turning direction of the front wheels 1 is inputted into the controller 10 by way of the output signal 4a of the front wheel turning angle sensor 4, and the controller 10 determines in which direction the rear wheels 2 are to be turned, i.e., in the equal phase or in the reverse phase, according to the vehicle speed detected by the vehicle speed sensor 12.

The controller 10 receives the output signal 4a of the front wheel turning angle sensor 4 and the output of the vehicle speed sensor 12 and controls the rear wheels 2 by way of the solenoid 20 and the driving motor 21A in accordance with control characteristics such as those shown in FIGS. 1 to 4.

The embodiment shown in FIG. 4 in which the hydraulic actuator 23 is used for driving the rear wheels 2 is advantageous in that the rear wheels 2 can be smoothly turned and no additional load is placed on the steering system.

However, heavy and expensive parts such as an electric motor, a hydraulic pump, a hydraulic actuator and valves are required for the hydraulic devices, which adds to the manufacturing cost and weight of the vehicle. Therefore hydraulic devices are not suitable for compact size cars.

Now, another embodiment of the present invention which uses a link mechanism for controlling the rear wheels and which is free from the drawbacks inherent to the hydraulic devices and is suitable for compact size cars will be described referring to FIG. 5.

In FIG. 5, the parts analogous to the parts in FIG. 4 are given like numerals and such parts will not be described here.

In FIG. 5, the tie rods 27 for the right and left rear wheels 2 are connected by a steering rod 41 which is movable in the lateral direction of the vehicle body to turn the rear wheels 2 rightwardly and leftwardly by way of the tie rods 27 and the knuckle arms 28. The steering rod 41 is operatively connected with the rack 6 of the front wheel steering device by way of a link mechanism. The link mechanism comprises a first L-shaped lever 31 which is rotatably supported on a fixed shaft 31a and has its one end 31A slidably received in a slot 6A formed on the rack 6. A connecting lever 32 is pivotably connected to the other end 31B of the first L-shaped lever 31 at one end 32A thereof. A pivotable lever 33 is pivotably connected to the other end 32B of the connecting lever 32 at one end 33A thereof and is pivotably supported on a fixed shaft 33a at the other end 33B thereof. A control lever 34 is pivotable connected to the end 32B of the connecting lever 32 together with the end 33A of the pivotable lever 33 at one end 34A thereof. The free end portion of the control lever 34 is slidably received in a receiving sleeve 35 which is mounted on a feed sleeve 36 by way of a pivot 35A. The feed sleeve 36 is engaged with a screw rod 37 to be slid back and force in the lateral direction of the vehicle body when the screw rod 37 is rotated. The screw rod 37 is rotated by a driving motor 38. To an intermediate portion of the control lever 34 is connected one end 39A of a connecting lever 39. The other end 39B of the connecting lever 39 is pivotably connected to one end 40A of a second L-shaped lever 40 which is pivotably supported on a fixed shaft 40a. The other end 40B of the second L-shaped lever 40 is slidably received in a slot 41A formed on the steering rod 41.

The driving motor 38 is connected to a controller 50 and is driven by the output thereof. The controller 50 is connected to a power source 51 and receives the output of a vehicle speed sensor 52. A potentiometer 53 for feeding back the position of the feed sleeve 36 on the screw rod 37 to the input of the driving motor 38 is disposed near the screw rod 37.

When the steering wheel 3 is turned to the left as shown by the arrow L, the steering shaft 3A, the pinion 5, the rack 6, the tie rods 7 and the knuckle arms 8 are moved in the directions shown by the respective arrows L to turn the front wheels 1 leftward. When the rack 6 is moved in the direction of the arrow L, the first L-shaped lever 31 is rotated clockwisely (as seen in FIG. 5) by way of engagement between the end 31A thereof and the slot 6A. When rotated clockwisely, the first L-shaped lever 31 pushes rearwardly the connecting lever 32 to swing counterclockwisely the pivotable lever 33 about the fixed shaft 33a. On the other hand when the rack 6 is moved in the direction opposite to the arrow L, the first L-shaped lever 31 is rotated counterclockwisely and the pivotable lever 33 is swung clockwisely. When the pivotable lever 33 is swung, the control lever 34 is swung in the same direction about the pivot 35A, by way of which the receiving sleeve 35 is connected to the feed sleeve 36. As can be seen from FIG. 5, when the feed sleeve 36 is on the right side (upper side in FIG. 5) of the end 39A of the connecting lever 39 and accordingly the pivot 35A is on the right side of the end 39A, the connecting lever 39 is pushed rearwardly as shown by the arrow L in response to the counterclockwise movement of the control lever 34, while when the feed sleeve 36 and the pivot 35A are on the left side of the end 39A of the connecting lever 39, the connecting lever 39 is pulled forwardly in response to the counterclockwise movement of the control lever 34. On the other hand, when the control lever 34 is swung clockwisely with the pivot 35A on the right side of the end 39A, the connecting lever 39 is pulled forwardly, while when the control lever 34 is swung clockwisely with the pivot 35A on the left side of the same, the connecting lever 39 is pushed rearwardly. When the pivot 35A is aligned with the end 39A of the connecting lever 39, the connecting lever 39 is not moved upon movement of the control lever 34 in either direction.

When the connecting lever 39 is pushed rearwardly, the second L-shaped lever 40 is rotated clockwisely as shown by the arrow L and the steering rod 41 is moved in the direction of the arrow L by way of the engagement between the end 40B of the second L-shaped lever 40 and the slot 41A of the steering rod 41 to turn the rear wheels leftward. On the other hand when the connecting lever 39 is pulled forwardly, the second L-shaped lever 40 is rotated counterclockwisely as shown by the arrow R and the rear wheels 2 are turned rightward.

That is, when the front wheels 1 are turned leftward with the feed sleeve 36 and the pivot 35A on the right side of the end 39A of the connecting lever 39, the rear wheels 2 are also turned leftward, while when the front wheels 1 are turned rightward with the feed sleeve 36 on the right side of the same, the rear wheels 2 are also turned rightward. On the other hand, when the feed sleeve 36 is on the left side of the end 39A of the connecting lever 39, the rear wheels 2 are turned in the direction opposite to the front wheels 1. Thus, when the feed sleeve 36 is on the right side of the end 39A, the rear wheels 2 are turned in the equal phase while when the feed sleeve 36 is left side of the same, the rear wheels 2 are turned in the reverse phase. When the pivot 35A is aligned with the end 39A, the rear wheels 2 are not turned even when the front wheels 1 are turned.

The turning angle of the second L-shaped lever 40 relative to that of the first L-shaped lever 31 and accordingly the turning angle of the rear wheels 2 relative to the turning angle of the front wheels 1 can be controlled by controlling the distance between the end 39A of the connecting lever 39 and the pivot 35A.

The feed sleeve 36 (and consequently the pivot 35A) is moved by rotating the screw rod 37 by the driving motor 38 which is driven by the output of the controller 50. Thus the controller 50 controls the turning direction and the turning angle of the rear wheels 2.

We claim:

1. A four-wheel steering device for a vehicle comprising a front wheel steering mechanism for turning the front wheels, a rear wheel steering mechanism for turning the rear wheels, a vehicle speed sensor for detecting the vehicle speed, and a controller for controlling the rear wheel steering mechanism, characterized in that said controller controls the rear wheel steering mechanism so that the rear wheel turning angle is changed in accordance with a turning angle ratio characteristic curve which is defined on a $\theta F$–$\theta R$ cartesian coordinate system wherein $\theta F$ and $\theta R$ respectively represent the front wheel turning angle and the rear wheel turning angle, said cartesian coordinate system including an origin, a positive $\theta F$ axis, a negative $\theta R$ axis and a positive $\theta R$ axis, said $\theta F$ axis and said positive $\theta R$ axis defining a quadrant I and said $\theta F$ axis and said negative $\theta R$ axis defining a quadrant IV, a positive $\theta R$ value denoting turning of the rear wheels in equal phase with the front wheels and a negative $\theta R$ value denoting turning of the rear wheels in reverse phase to the front wheels, and which is changed according to the vehicle speed, the turning angle ratio characteristic curve for very low vehicle speeds not higher than a first predetermined speed including a first portion extending on said $\theta F$ axis in the region in which the value of $\theta F$ is smaller than a first predetermined value and a second portion having a negative inclination to extend into quadrant IV so that the rear wheels are turned in the reverse phase when the front wheel turning angle exceeds the predetermined value, the first and second portions being connected with each other at a reverse phase starting point having values of $\theta F$ and $\theta R$ respectively equal to the first predetermined value and zero, and the turning angle ratio characteristic curve for vehicle speeds higher than said first predetermined speed having a positive inclination to extend into quadrant I so that the front wheels and rear wheels are turned in the equal phase, said turning angle ratio characteristic curve for vehicle speeds higher than said first predetermined speed comprising a plurality of lines with different positive inclinations extending from the origin of the $\theta F$ and $\theta R$ axes, increasing inclination of the line corresponding to increasing vehicle speed; a turning angle sensor for detecting whether or not the front wheel turning angle ($\theta F$) exceeds the first predetermined value and said controller includes means for setting the turning angle ratio curve for very low vehicle speeds in response to output of the turning angle sensor when the vehicle speed detected by the vehicle speed sensor is not higher than the first predetermined speed and means for setting the turning angle ratio characteristic curve for vehicle speeds higher than the first predetermined speed when the vehicle speed detected by the vehicle speed sensor is higher than the first predetermined speed.

2. A four-wheel steering device as defined in claim 1, in which the absolute value of the inclination of said second portion increases with reduction of the vehicle speed.

3. A four wheel steering device for a vehicle comprising a front wheel steering mechanism for turning the front wheels, a rear wheel steering mechanism for turning the rear wheels, a vehicle speed sensor for detecting the vehicle speed, and a controller for controlling the rear wheel steering mechanism, characterized in that said controller controls the rear wheel steering mechanism so that the rear wheel turning angle is changed in accordance with a turning angle ratio characteristic curve which is defined on a $\theta F$–$\theta R$ cartesian coordinate system wherein $\theta F$ and $\theta R$ respectively represent the front wheel turning angle and the rear wheel turning angle, said cartesian coordinate system including an origin, a positive $\theta F$ axis, a negative $\theta R$ axis and a positive $\theta R$ axis, said $\theta F$ axis and said positive $\theta R$ axis defining a quadrant I and said $\theta F$ axis and said negative $\theta R$ axis defining a quadrant IV, a positive $\theta R$ value denoting turning of the rear wheels in equal phase with the front wheels and a negative $\theta R$ value denoting turning of the rear wheels in reverse phase to the front wheels, and which is changed according to the vehicle speed, the turning angle ratio characteristic curve for very low vehicle speeds not higher than a first predetermined speed including a first portion extending on the $\theta F$ axis in the region in which the value of $\theta F$ is smaller than a first predetermined value and a second portion having a negative inclination to extend into quadrant IV so that the rear wheels are turned in the reverse phase when the front wheel turning angle exceeds the predetermined value, the first and second portions being connected with each other at a reverse phase starting point having the values of $\theta F$ and $\theta R$ respectively equal to the first predetermined value and zero, the absolute value of the inclination of the second portion being increased with reduction of the vehicle speed and the turning angle ratio characteristic curve for the vehicle speeds higher than said first predetermined speed being substantially a broken line having an inflection point at which the inclination thereof is changed and having a positive first inclination in the region where the value of $\theta F$ is smaller than the value of $\theta F$ at the inflection point and a second inclinatgion smaller than the first inclination in the region where the value of $\theta F$ is not smaller than the value of $\theta F$ at the inflection point; a turning angle sensor for detecting whether or not the front wheel turning angle ($\theta F$) exceeds the first predetermined value and said controller includes means for setting the turning angle ratio curve for very low vehicle speeds in response to output of the turning angle sensor when the vehicle speed detected by the vehicle speed sensor is not higher than the first predetermined speed and means for setting the turning angle ratio characteristic curve for vehicle speeds higher than the first predetermined speed when the vehicle speed detected by the vehicle speed sensor is higher than the first predetermined speed.

4. A four-wheel steering device as defined in claim 3, in which said rear wheel steering mechanism comprises a hydraulic actuator operatively connected to the rear wheels to turn them, a hydraulic pressure source for delivering hydraulic pressure to the hydraulic actuator and a control valve operatively inserted between the hydraulic actuator and the hydraulic pressure source to control the direction of the pressure to be fed to the hydraulic actuator, thereby controlling the turning direction of the rear wheels, said controller controlling the hydraulic pressure source and the control valve to control the value and direction of the hydraulic pressure to be delivered to the hydraulic actuator according to said turning angle ratio characteristic curve.

5. A four-wheel steering device as defined in claim 3, in which said rear wheel steering mechanism comprises a control lever means which is operatively connected to the front wheel steering mechanism to be swung on a movable pivot in first and second directions according to the turning direction of the front wheels, a connecting lever means which is movable in first and second directions and is connected to the control lever means at a junction point at an intermediate portion of the control lever means so that when the movable pivot is on one side of the junction point, the swinging movements of the control lever means in the first and second directions respectively cause the movements of the connecting lever means in the first and second directions, while when the movable pivot is on the other side of the junction point, the swinging movements of the control lever means in the first and second directions respectively cause the movements of the connecting lever means in the second and first directions, the connecting lever means being operatively connected to the rear wheels to turn them in response to the movement thereof in the first or second direction, the amount of the movement of the connecting lever means relative to the amount of the movement of the control lever means being determined by the distance between the junction point and the movable pivot, and said controller controlling the position of the movable pivot to control the turning angle of the rear wheels according to said turning angle ratio characteristics curve.

6. A four-wheel steering device for a vehicle comprising a front wheel steering mechanism for turning the front wheels, a rear wheel steering mechanism for turning the rear wheels, a vehicle speed sensor for detecting the vehicle speed, and a controller for controlling the rear wheel steering mechanism, characterized in that said controller controls the rear wheel steering mechanism so that the rear wheel turning angle is changed in accordance with a turning angle ratio characteristic curve which is defined on a $\theta F$-$\theta R$ cartesian coordinate system wherein $\theta F$ and $\theta R$ respectively represent the front wheel turning angle and the rear wheel turning angle, said cartesian coordinate system including an origin, a positive $\theta F$ axis, a negative $\theta R$ axis, and a positive $\theta R$ axis, said $\theta F$ axis and said $\theta R$ axis defining a quadrant I and said $\theta F$ axis and said negative $\theta R$ axis defining a quadrant II, a positive $\theta R$ value denoting turning of the rear wheels in equal phase with the front wheels and a negative $\theta R$ value denoting turning of the rear wheels in reverse phase to the front wheels, and which is changed according to the vehicle speed, the turning angle ratio characteristic curve for very low vehicle speeds not higher than a first predetermined speed including a first portion extending on said $\theta F$ axis in the region in which the value of $\theta F$ is smaller than a first predetermined value and a second portion having a negative inclination to extend into quadrant IV so that the rear wheels are turned in the reverse phase when the front wheel turning angle exceeds the predetermined value, the first and second portions being connected with each other at a reverse phase starting point having the values of $\theta F$ and $\theta R$ respectively equal to a first predetermined value and zero, and the turning angle ratio characteristic curve for vehicle speeds higher than said first predetermined speed is substantially a broken line having an inflection point at which the inclination thereof is changed and has a positive first inclination in the region where the value of $\theta F$ is smaller than the value of $\theta F$ at the inflection point and a second inclination smaller than the first inclination in the region where the value of $\theta F$ is not smaller than the value of $\theta F$ at the inflection point, the second inclination of the turning angle ratio characteristic curve for vehicle speeds higher than said first predetermined speed and lower than a second predetermined speed being negative so that the turning angle ratio characteristic curve intersects the $\theta F$ axis, whereby the rear wheels are turned in the reverse phase when the front wheel turning angle exceeds the value of $\theta F$ at the intersection of the turning angle ratio characteristic curve and the $\theta F$ axis, the turning angle ratio characteristic curve for vehicle speeds higher than the second predetermined speed being held above the $\theta F$ axis, wherein for the vehicle speeds higher than said first predetermined speed and lower than the second predetermined speed, said intersection of the turning angle ratio characteristic curve and said $\theta F$ axis is shifted in the direction of increasing $\theta F$ as the vehicle speed increases; a turning angle sensor for detecting whether or not the front wheel turning angle ($\theta F$) exceeds the first predetermined value and said controller includes means for setting the turning angle ratio curve for very low vehicle speeds in response to output of the turning angle sensor when the vehicle speed detected by the vehicle speed sensor is not higher than the first predetermined speed and means for setting the turning angle ratio characteristic curve for vehicle speeds higher than the first predetermined speed when the vehicle speed detected by the vehicle speed sensor is higher than the first predetermined speed.

7. A four-wheel steering device as defined in claim 3, in which said turning angle ratio characteristic curve for the vehicle speeds higher than the first predetermined speed is changed according to the vehicle speed so that the inflection point is shifted, as the vehicle speed decreases, in the direction in which the value of $\theta F$ is reduced.

8. A four-wheel steering device as defined in claim 6, in which said turning angle ratio characteristic curve for the vehicle speeds higher than the first predetermined speed is changed according to the vehicle so that the inflection point is shifted, as the vehicle speed decreases, in the direction in which the value of $\theta F$ is increased.

9. A four-wheel steering device as defined in claim 6, in which said first predetermined speed is about 10Km/h, and said second predetermined speed is about 80Km/h.

10. A four-wheel steering device for a vehicle comprising a front wheel steering mechanism for turning the front wheels, a rear wheel steering mechanism for turning the rear wheels, a vehicle speed sensor for detecting the vehicle speed, and a controller for controlling the rear wheel steering mechanism, characterized in that said controller controls the rear wheel steering mechanism so that the rear wheel turning angle is changed in accordance with a turning angle ratio characteristic curve which is defined on a $\theta F$-$\theta R$ cartesian coordinate system wherein $\theta F$ and $\theta R$ respectively represent the front wheel turning angle and the rear wheel turning angle, said cartesian coordinate system including an origin, a positive $\theta F$ axis, a negative $\theta R$ axis and a positive $\theta R$ axis, said $\theta F$ axis and said positive $\theta R$ axis defining a quadrant I and said $\theta F$ axis and said negative $\theta R$ axis defining a quadrant II, a positive $\theta R$ value denoting turning of the rear wheels in equal phase with the front wheels and a negative $\theta R$ value denoting turning of the rear wheels in reverse phase to the front wheels, and which is changed according to the vehicle speed, the turning angle ratio characteristic curve for very low vehicle speeds not higher than a first predetermined speed including a first portion extending on the $\theta F$ axis in the region in which the value of $\theta F$ is smaller than a first predetermined value and a second portion having a negative inclination to extend into quadrant IV so that the rear wheels are turned in the reverse phase when the front wheel turning angle exceeds the predetermined value, the first and second portions being connected with each other at a reverse phase starting point having the values of $\theta F$ and $\theta R$ respectively equal to the first predetermined value and zero, and the turning angle ratio characteristic curve for vehicle speeds higher than said first predetermined speed is substantially a broken line having an inflection point at which the inclination thereof is changed and has a positive first inclination in the region where the value of $\theta F$ is smaller than the value of $\theta F$ at the inflection point and a second inclination smaller than the first inclination in the region where the value of $\theta F$ is not smaller than the value of $\theta F$ at the inflection point, said turning angle ratio characteristic curve for vehicle speeds higher than said first predetermined speed being changed according to the vehicle speed so that the inflection point is continuously shifted to converge on said reverse phase starting point as the vehicle speed is reduced; a turning angle sensor for detecting whether or not the front wheel turning angle ($\theta F$) exceeds the first predetermined value and said controller includes means for setting the turning angle ratio curve for very low vehicle speeds in response to output of the turning angle sensor when the vehicle speed detected by the vehicle speed sensor is not higher than the first predetermined speed and means for setting the turning angle ratio characteristic curve for vehicle speeds higher than the first predetermined speed when the vehicle speed detected by the vehicle speed sensor is higher than the first predetermined speed.

11. A four-wheel steering device as defined in claim 10, in which said turning angle ratio characteristic curve for the vehicle speeds higher than the first predetermined speed is changed according to the vehicle speed so that the inflection point is shifted, as the vehicle speed decreases, in the direction in which the value of $\theta F$ is reduced.

12. A four-wheel steering device as defined in claim 10, in which said turning angle ratio characteristic curve for the vehicle speeds higher than the first predetermined speed is changed according to the vehicle speed so that the inflection point is shifted, as the vehicle speed decreases, in the direction in which the value of $\theta F$ is increased.

13. A four-wheel steering device as defined in claim 10, in which said first predetermined speed is about 10Km/h.

* * * * *

UNITED STATES PATENT AND TRADEMARK OFFICE
CERTIFICATE OF CORRECTION

PATENT NO. : 4,657,102

DATED : April 14, 1987

INVENTOR(S) : KANAZAWA et al.

It is certified that error appears in the above-identified patent and that said Letters Patent is hereby corrected as shown below:

On the Title Page:

Please change the name of the assignee [73] from "Toyo Kogyo Co., Ltd." to "Mazda Motor Corporation".

Signed and Sealed this

Sixth Day of October, 1987

Attest:

DONALD J. QUIGG

Attesting Officer

Commissioner of Patents and Trademarks